Nov. 18, 1947. D. SCIAKY 2,431,083
ELECTRIC VALVE CONVERTING SYSTEM
Filed Sept. 1, 1944 2 Sheets-Sheet 1
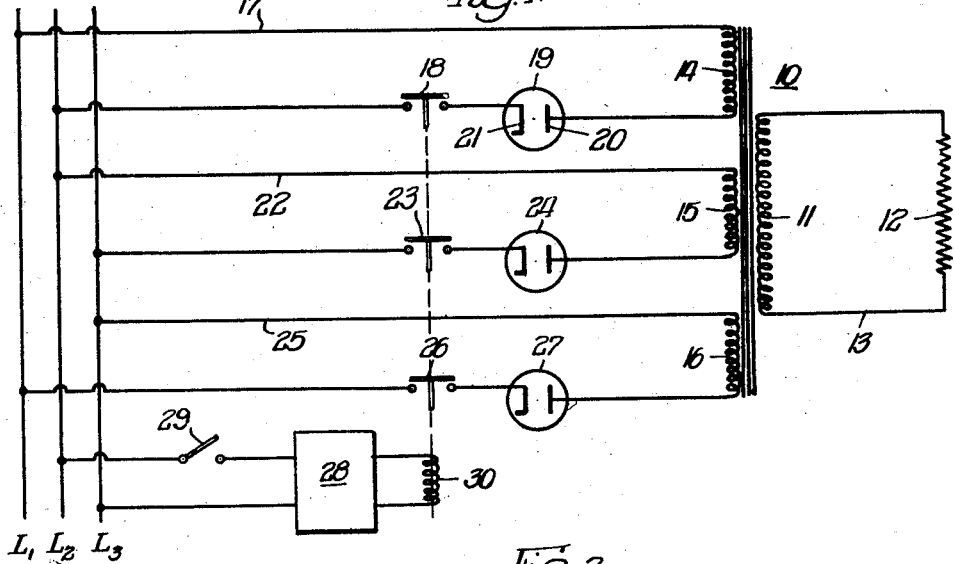
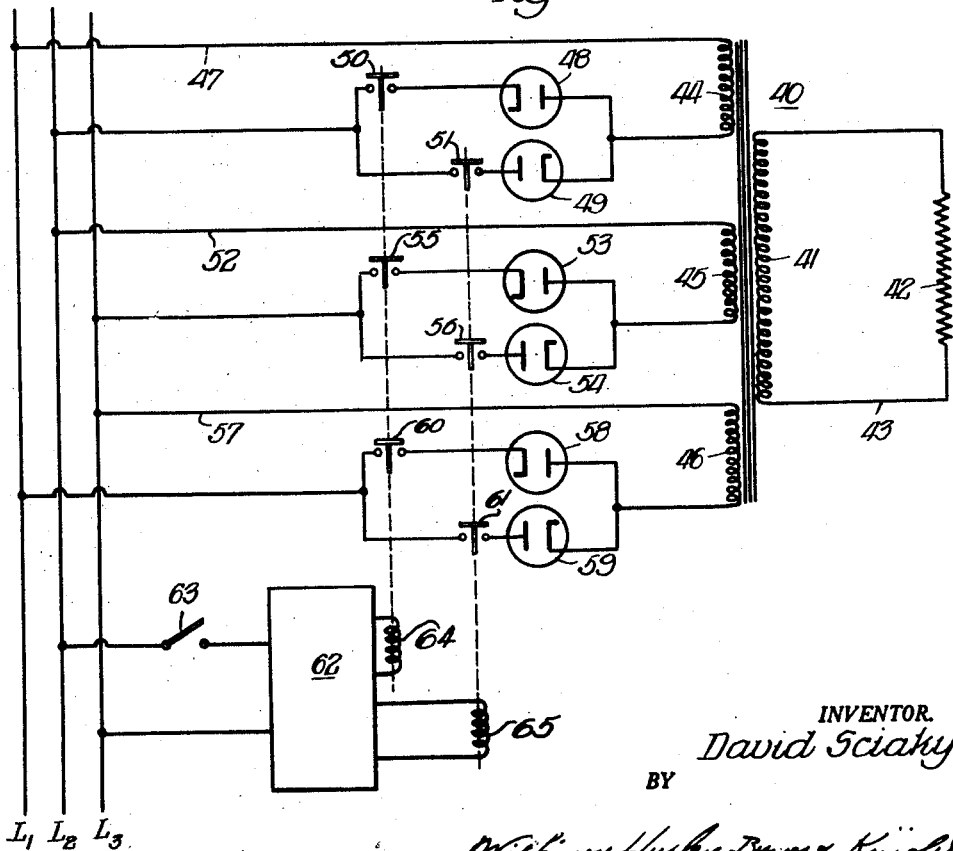
INVENTOR.
David Sciaky.
BY Nov. 18, 1947.  D. SCIAKY  2,431,083
ELECTRIC VALVE CONVERTING SYSTEM
Filed Sept. 1, 1944  2 Sheets-Sheet 2

INVENTOR.
David Sciaky,
BY
Wilkinson, Huxley, Byron & Knight
ATTYS

Patented Nov. 18, 1947

2,431,083

UNITED STATES PATENT OFFICE 2,431,083

ELECTRIC VALVE CONVERTING SYSTEM

David Sciaky, Chicago, Ill., assignor to Welding Research, Inc., Chicago, Ill., a corporation of Illinois Application September 1, 1944, Serial No. 552,307

10 Claims. (Cl. 172—281)

The invention relates to an electric valve converting system and has particular reference to a method and apparatus for converting polyphase power to unidirectional power impulses or to a form of single phase alternating current.

The improvements of the invention have special value and utility in the welding field but since the system is not limited thereto it has been disclosed and described in its basic aspect as a system for transmitting power from a polyphase supply to a single phase work circuit. The invention has application to those systems principally found in the welding art wherein the output in the secondary work circuit in the form of a unidirectional current impulse is produced by a flow of primary current which is terminated when a predetermined value is reached.

A general object of the invention is to provide a system for the transmission of power from a polyphase supply to a single phase work circuit and wherein a balanced load will be drawn from the polyphase supply.

Another object resides in the provision of an electric valve converting system for a polyphase supply which will deliver to a load circuit any one of three types of power output, a single unidirectional current impulse, a series of unidirectional current impulses of the same polarity, or a series of current impulses, each impulse being opposite in polarity to the one immediately preceding it, thereby comprising a form of alternating current.

Another object resides in the provision of an electric valve converting system having reactive means in the form of primary windings in inductive relation with a secondary winding and wherein each primary winding has individual circuit connections to its respective phase of the polyphase supply line with electric valve means for controlling the current impulses supplied to the primary windings, respectively.

A further object of the invention is to provide an electric valve converting system for energizing the secondary load circuit of a transformer from a polyphase supply and wherein each phase is individually controlled, with the combined output of the phases resulting in a single current impulse in the secondary load circuit for each energization.

Another object of the invention is to provide a system as described wherein the series of current impulses in the secondary load circuit may be varied as to frequency and magnitude, with a minimum duration for any impulse comprising one-half of a cycle of the supply line frequency and the minimum time between impulses comprising one-sixth of a cycle of the supply line frequency.

Another object of the invention is to provide a system for the conversion of polyphase supply current into a type of power output comprising current impulses which are unidirectional, and which are derived from primary current impulses flowing through separate primary windings corresponding to the phases of the polyphase source of supply.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a circuit diagram illustrating the invention in its simplest form;

Figure 2 is a circuit diagram illustrating a modification coming within the invention;

Figure 3:
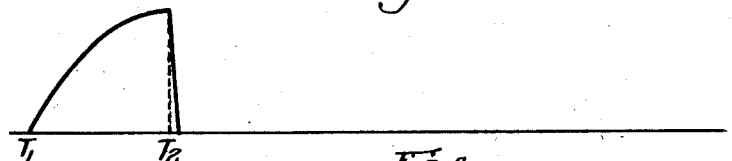
Figure 3 is a view illustrating graphically the power output as a single unidirectional current impulse.

Referring to the form of the invention shown in Figure 1, the transformer 10 includes the primary windings 14, 15 and 16, a secondary winding 11, connected to a load 12 by means of a circuit 13. One side of primary winding 14 is directly connected by conductor 17 with line $L_1$ of the three-phase alternating current supply and the other side of said primary winding is connected to $L_2$ through a contactor 18 and an electric valve 19 such as a gaseous discharge tube of the diode type having an anode 20 and a cathode 21. In a similar manner winding 15 is electrically connected across lines $L_2$ and $L_3$, the circuit including a conductor 22, the contactor 23, and the electric valve 24. The circuit for winding 16 includes a conductor 25, contactor 26 and electric valve 27, said winding being connected across lines $L_3$ and L₁. A sequencing timer 28 is connected to two of the supply lines in series with a switch 29. The timer provides a coil 30 which controls the closing and opening of the contactors 18, 23 and 26.

Although the electric valves disclosed in the drawings are of the electronic type, other types of valves may be employed such as the copper-oxide rectifier.

The contactors are normally open, that is, the contactors maintain the circuits to the windings 14, 15 and 16 normally open so that the system is inoperative when the coil 30 is deenergized. When switch 29 is closed the coil 30 is energized, causing the contactors 18, 23 and 26 to close and they remain closed until the coil 30 is deenergized after a predetermined time interval according to the setting of the timer 28. With the contactors closed the primary windings 14, 15 and 16 are separately connected to their respective phase of the alternating current source. When the voltage between lines L₁ and L₂ is of such polarity that the current tries to flow from line L₁ to L₂ a path is provided therefor including conductor 17, primary winding 14, electric valve 19, and the closed contactor 18. When the voltage between lines L₁ and L₂ reverses its direction, the current flow through primary winding 14 is terminated as a result of the action of tube 19 which functions to pass current in one direction only.

Figure 6:
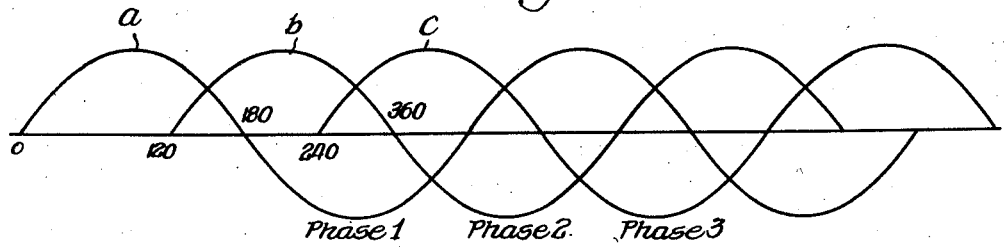
Figure 6 shows the three-phase alternating supply current as conventional sine waves displaced 120 degrees in phase.
Figure 7:
Figure 7 is a reproduction of an actual oscillogram of a series of unidirectional current impulses comprising the output of a system coming within the invention.

Before current flow is terminated in winding 14 the voltage between lines L₂ and L₃ will have become of such polarity as to cause current to flow from line L₂ through conductor 22, winding 15, electric valve 24, and contactor 23 to line L₃. Then in turn the current will flow from line L₃ through conductor 25, winding 16, electric valve 27 and contactor 26 to line L₁. Each winding is therefore supplied with an impulse of current comprising a portion of the half cycle of the particular phase to which the winding is connected. Referring to Figure 6, it may be assumed that during positive half cycle $a$ of phase 1 current was supplied to the winding 14, then during positive half cycle $b$ of phase 2 current was supplied to winding 15 and during the positive half cycle $c$ of phase 3 current was supplied to winding 16. Each primary current impulse is accordingly of the same polarity and the direction of flow through the windings is also the same.

The primary current impulses will flow through the primary windings 14, 15 and 16 in sequence according to the phase relation of the source and then repeat the operation as long as coil 30 remains energized. The "on" period is determined by the setting of the timer 28. When the "on" period is terminated by deenergization of coil 30, which causes the contactors to open, one impulse of unidirectional secondary current will have been induced in the secondary winding 11. This type of power output is graphically illustrated in Figure 3. The "on" period which is controlled by the timer 28 is represented by T₁—T₂. To secure a series of unidirectional current impulses in the secondary load circuit, as illustrated in Figure 4, the coil 30 is again energized and current impulses are caused to flow through windings 14, 15 and 16 in sequence for a period represented by T₃—T₄ and then following an "off" period by T₅—T₆ and so on. The duration of this "off" period is likewise under the control of the timer 28, and when producing a series of impulses it will be necessary to set the timer for both periods. The series of impulses in the load circuit will occur periodically as long as the operator maintains the switch 29 closed.

Figure 5:
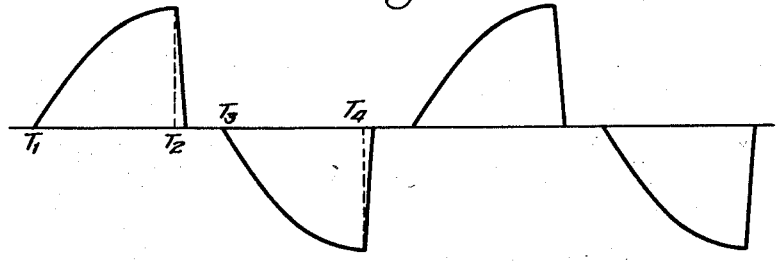
Figure 5 is a view illustrating graphically the power output as a form of alternating current.

In the modification of Figure 1 the primary current impulses will always flow through the windings 14, 15 and 16 in the same direction. Therefore this system will produce a single impulse in the load circuit or a series of impulses. The type of output shown in Figure 5 requires a system as shown in Figure 2 and this modification will now be described.

The transformer 40 is provided with the primary windings 44, 45 and 46, and a secondary winding 41 having connection to a load circuit 43 including a load represented by 42. Each primary winding is individually connected to its respective phase as described in Figure 1. One side of winding 44 is directly connected to line L₁ by the conductor 47. The other side of said winding is connected to line L₂ through a parallel circuit including the electric valves 48 and 49 and the contactors 50 and 51. The valves are so arranged that the cathode of valve 48 is directly connected to its contactor 50, whereas, the anode of valve 49 is directly connected to its contactor 51. This arrangement of the valves may be described as an anti-parallel connection, or the valves may be stated as having inverse connection with their respective primary winding. The windings 45 and 46 have circuits which are similar, it being understood that winding 45 is connected across lines L₂ and L₃ and that winding 46 is connected across lines L₃ and L₁. The sequencing timer 62 is connected across any two of the supply lines in series with a switch 63. The timer provides two coils 64 and 65 which control the closing and opening of the contactors. Coil 64 controls contactors 50, 55 and 60, whereas, coil 65 controls contactors 51, 56 and 61.

Figure 4:
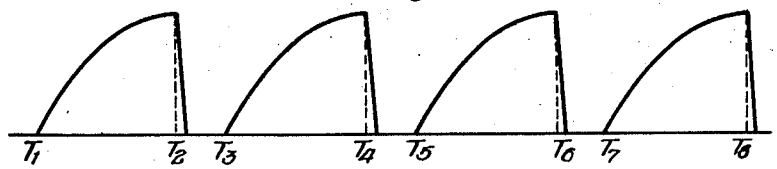
Figure 4 is a view illustrating graphically the power output as a series of unidirectional current impulses.

The timer 62 is so constructed that when switch 63 is closed only one coil, either 64 or 65 is energized. One arrangement of the timer permits the energizing of only one coil which is subsequently deenergized after a measured interval of time. The operation is the same as described with respect to Figure 1 and the output comprises a single unidirectional impulse such as shown in Figure 3. If the timer is arranged so that either coil 64 or 65, but not both, is alternately energized and deenergized, a series of impulses all of the same polarity are produced in the secondary load circuit. Finally if the timer is so arranged that each time the switch 63 is closed the coils 64 and 65 are alternately energized, the output will comprise a series of impulses each one having opposite polarity from the one preceding it. This type of output comprises a form of alternating current.

For producing this form of alternating current the system of Figure 2 operates as follows. With the switch 63 closed, coil 64 is assumed to be energized, closing contactors 50, 55 and 60. During the positive half cycle $a$ of phase 1 current will flow through winding 44 in a downward direction and this primary current impulse is followed by the positive half cycle $b$ of phase 2 which flows downwardly in winding 45 and then by the positive half cycle $c$ of phase 3, flowing downwardly through winding 46. The impulses are repeated until the coil 64 is deenergized and the contactors 50, 55 and 60 open. A unidirectional impulse is thereby induced in the secondary winding. The coil 65 is now energized by the timer 62 which closes contactors 51, 56 and 61. During the next negative half cycle of the polyphase supply, current will flow through one of the windings, the particular phase depending on the instant of closing of the contactors 51, 56 and 61. If the phase 2 is selected, for example, the flow will be from L₂ through the closed contactor 56, valve 54 and upwardly through winding 45 back to line L₀. This primary current impulse is followed by a similar impulse through winding 46, taking place during the next negative half cycle of phase 3 and then by an impulse through winding 44 during the next negative half cycle of phase 1. These impulses flow upwardly through their windings and they continue in sequence until coil 65 is deenergized. The current impulse induced in the secondary load circuit is therefore opposite in polarity to the first impulse. Alternate positive and negative impulses are obtained in the load circuit and which comprise a form of alternating current.

The frequency and magnitude of the impulses comprising the power output of the converting system of the invention can be varied by adjustment of the timer. The "on" time or duration of each impulse may be varied between a minimum of one-half of a cycle of the supply line frequency to any maximum value within the limitations of the system. The "off" time, or interval between impulses may be varied between a minimum of one-sixth of a cycle of the supply line frequency to any maximum value.

In the electric power converting system of the invention the first impulse of primary current generates magnetic flux in the transformer and each successive current impulse flowing through the windings in sequence according to the phase relation of the source has the effect of building up this magnetic flux, with the result that a steady rise in the flux takes place, inducing an impulse of unidirectional current in the secondary winding. In order for the magnetic flux to rise in a steady manner the use of electric valves is required. The valves rectify the currents of the respective phases so that they have a unidirectional flow. Thus, each magnetizing current impulse will flow through its primary winding in a direction to augment the magnetic flux, and one impulse of unidirectional current is induced in the secondary, comprising the combined output of the phases of the polyphase supply for that particular energization.

The invention has been disclosed and described in its basic form with the sequencing timer being schematically illustrated for simplicity purposes and for the further reason that the details of this timer do not comprise any part of the invention. It is to be understood, however, that the timer may comprise a type of mechanism which will start the current flow in the primary windings in synchronism with the sine wave of the supply voltage and which will operate to interrupt the primary circuits at zero current. While the closing and opening of the primary circuits is obtained in the illustrated embodiment of the invention by means of electromagnetically operated contactors, this operation may be performed in the same efficient manner by using control grids in connection with the discharge valves shown. It is also possible when using control grids to predetermine the firing point in relation to the sine wave of the supply voltage for thus controlling the magnitude of the induced secondary current and thus its heat effect. When employing grid control valves, electronic timers will replace the timers 28 and 62 disclosed in Figures 1 and 2, respectively.

The invention is not to be limited to or by details of construction of the particular embodiment thereof illustrated by the drawings as various forms of the device will of course be apparent to those skilled in the art without departing from the spirit of the invention or the scope of the claims.

What is claimed is:

1. The method of converting polyphase current to unidirectional current impulses which consists in rectifying the current in each phase respectively of the polyphase current source to derive current impulses from the phases having the same polarity, passing said rectified currents through separate windings according to the phase relation of the electromotive forces in the polyphase current supply, whereby to cause magnetizing current impulses to flow through said windings in the same direction to produce a unidirectional rise of the magnetic flux caused by the successive action of said windings, and inducing a unidirectional electromotive force in a secondary winding inductively associated with said first mentioned windings.

2. The method of converting polyphase current to unidirectional current impulses, which consists in rectifying the current in each phase respectively of the polyphase current source to derive current impulses from the phases having the same polarity, passing said rectified currents through separate windings according to the phase relation of the electromotive forces in the polyphase current supply, whereby to cause magnetizing current impulses to flow through said windings in the same direction to produce a unidirectional rise of the magnetic flux caused by the successive action of said windings, controlling the duration of the current flowing period for said windings, and during said period inducing a unidirectional electromotive force in a secondary winding inductively associated with said first mentioned windings.

3. The method of converting polyphase current to unidirectional current impulses, which consists in rectifying the current in each phase respectively of the polyphase current source to derive current impulses from the phases having the same polarity, passing said rectified currents through separate windings according to the phase relation of the electromotive forces in the polyphase current supply, whereby to cause magnetizing current impulses to flow through said windings in the same direction to produce a unidirectional rise of the magnetic flux caused by the successive action of said windings, controlling the duration of the current flowing period for said windings, during said period inducing a unidirectional electromotive force in a secondary winding inductively associated with said first mentioned windings, and for each following period reversing the direction of flow of the magnetizing current impulses through the separate windings to induce electromotive forces in the secondary winding periodically reversing in polarity.

4. In a converting system for a polyphase alternating current source, reactive means corresponding in number to the phases of said polyphase current source and having electrical connection to the phases respectively, an electric valve in the circuit of each reactive means in series therewith, said electric valves having connection with their reactive means respectively so as to translate power from said source as a succession of current impulses of the same polarity and which flow through said reactive means in sequence, and a work circuit in inductive relation with said reactive means.

5. In a system for delivering power to a single phase work circuit from a polyphase alternating current supply, the combination including a transformer having a secondary winding electrically connected to said work circuit and a plurality of primary windings each electrically connected to its respective phase of the polyphase alternating current supply, each primary circuit including an electric valve and means for controlling flow of current through said valve.

6. In a system for delivering power to a single phase work circuit from a polyphase alternating current supply, the combination including a transformer having a secondary winding and a plurality of individual primary windings, means electrically connecting the secondary winding to said work circuit, a primary circuit for each of said primary windings electrically connecting the winding to its respective phase of the polyphase alternating current supply, each primary circuit including an electric valve and means for controlling flow of current through the valve, and timing means deriving its power from the polyphase supply current for controlling the duration of the current flowing period for the plurality of primary windings.

7. In a system for delivering power to a single phase work circuit from a polyphase alternating current supply, the combination including a transformer having a secondary winding and a plurality of individual primary windings, means electrically connecting the secondary winding to said work circuit, a primary circuit for each of said primary windings electrically connecting the winding to its respective phase of the polyphase alternating current supply, each primary circuit including an electric discharge valve and a contactor in series connection therewith, a timer electrically connected to a phase of said polyphase supply current, and a coil provided by said timer for controlling the closing and opening of said contactors, the contactors of said primary circuits closing in unison when the coil is energized and opening in unison upon deenergization of the coil.

8. In a converting system, the combination of a polyphase current supply and a load circuit, of a transformer having a secondary winding electrically connected to the load circuit and having a plurality of primary windings corresponding in number to the phases of the polyphase current supply, circuit means for each primary winding electrically connecting the winding to its respective phase, each circuit means including a parallel circuit in series with the winding and comprising in each branch thereof an electric discharge valve in series connection with a contactor, the valves of each having an anode and a cathode and being arranged whereby the cathode of one valve of each parallel circuit directly connects with its contactor, with the anode of the other valve directly connecting with its contactor, and timer means deriving its power from the polyphase current supply for controlling the closing and opening of said contactors.

9. In a converting system, the combination of a polyphase current supply and a load circuit, of a transformer having a secondary winding electrically connected to the load circuit and having a plurality of primary windings corresponding in number to the phases of the polyphase current supply, circuit means for each primary winding electrically connecting the winding to its respective phase, each circuit means including a parallel circuit in series with the winding and comprising in each branch thereof an electric discharge valve in series connection with a contactor, the valves of each having an anode and a cathode and being arranged whereby the cathode of one valve of each parallel circuit directly connects with its contactor, with the anode of the other valve directly connecting with its contactor, and timer means for controlling the opening and closing of the contactors, said timer means causing certain contactors to close in unison provided the remaining contactors are open.

10. In a converting system, the combination of a polyphase current supply and a load circuit, of a transformer having a secondary winding electrically connected to the load circuit and having a plurality of primary windings corresponding in number to the phases of the polyphase current supply, circuit means for each primary winding electrically connecting the winding to its respective phase, each circuit means including a parallel circuit in series with the winding and comprising in each branch thereof an electric discharge valve in series connection with a contactor, the valves of each having an anode and a cathode and being arranged whereby the cathode of one valve of each parallel circuit directly connects with its contactor, with the anode of the other valve directly connecting with its contactor, a timer electrically connected to a phase of said polyphase current supply, and two coils provided by said timer and being alternately energized by said timer for controlling the closing and opening of said contactors

DAVID SCIAKY.

REFERENCES CITED

The following references are of record in the file of this patent:

UNITED STATES PATENTS

| Number | Name | Date |
| --- | --- | --- |
| 1,997,644 | Long | Apr. 6, 1935 |
| 1,157,730 | Spinelli | Oct. 26, 1915 |